US012638046B2

(12) United States Patent
Ooms et al.

(10) Patent No.: US 12,638,046 B2
(45) Date of Patent: May 26, 2026

(54) SELF-REPAIRING PLAIN BEARING

(71) Applicant: ZF FRIEDRICHSHAFEN AG,
Friedrichshafen (DE)

(72) Inventors: Maarten Ooms, Geel. (BE); Thomas Meinerz, Friedrichshafen (DE); Roger Karl, Karlsruhe (DE)

(73) Assignee: ZF FRIEDRICHSHAFEN AG,
Friedrichshafen (DE)

( * ) Notice: Subject to any disclaimer, the term of this patent is extended or adjusted under 35 U.S.C. 154(b) by 297 days.

(21) Appl. No.: 17/778,010

(22) PCT Filed: Oct. 19, 2020

(86) PCT No.: PCT/EP2020/079361

§ 371 (c)(1),
(2) Date: May 19, 2022

(87) PCT Pub. No.: WO2021/104748

PCT Pub. Date: Jun. 3, 2021

(65) Prior Publication Data

US 2022/0412401 A1     Dec. 29, 2022

(30) Foreign Application Priority Data

Nov. 25, 2019     (DE) ..................... 10 2019 218 117.1

(51) Int. Cl.
F16C 17/24          (2006.01)
(52) U.S. Cl.
CPC ........ F16C 17/246 (2013.01); *F16C 2233/00* (2013.01); *F16C 2360/31* (2013.01)

(58) Field of Classification Search
CPC .............. G01M 13/045; F16C 2233/00; F16C 2360/31; F16C 17/246
See application file for complete search history.

(56) References Cited

U.S. PATENT DOCUMENTS

| | | | |
|---|---|---|---|
| 9,933,333 B2 | 4/2018 | Kawada et al. | |
| 2012/0070280 A1 | 3/2012 | Wadehn | |
| 2014/0355913 A1 | 12/2014 | Pedersen et al. | |
| 2016/0223014 A1 | 8/2016 | Nakamura | |
| 2016/0341248 A1* | 11/2016 | Guettler ............... | F16C 23/041 |
| 2021/0372466 A1 | 12/2021 | Wolf et al. | |

FOREIGN PATENT DOCUMENTS

| | | |
|---|---|---|
| CN | 101893035 A | 11/2010 |
| CN | 108506355 A | 9/2018 |
| DE | 102008023050 A1 | 11/2009 |
| DE | 102017223418 A1 | 6/2019 |
| EP | 2246580 A1 | 11/2010 |
| EP | 3438231 A1 | 2/2019 |

* cited by examiner

*Primary Examiner* — Moshe Wilensky
(74) *Attorney, Agent, or Firm* — LEYDIG, VOIT & MAYER, LTD.

(57)          ABSTRACT

A method for operating a plain bearing including: determining a first rotational speed at which a transition of a lubrication state takes place, or at which friction in the plain bearing is at a minimum; comparing the first rotational speed to a threshold value; and if the rotational speed has exceeded the threshold value, operating the bearing to produce a self-repairing effect.

8 Claims, 1 Drawing Sheet

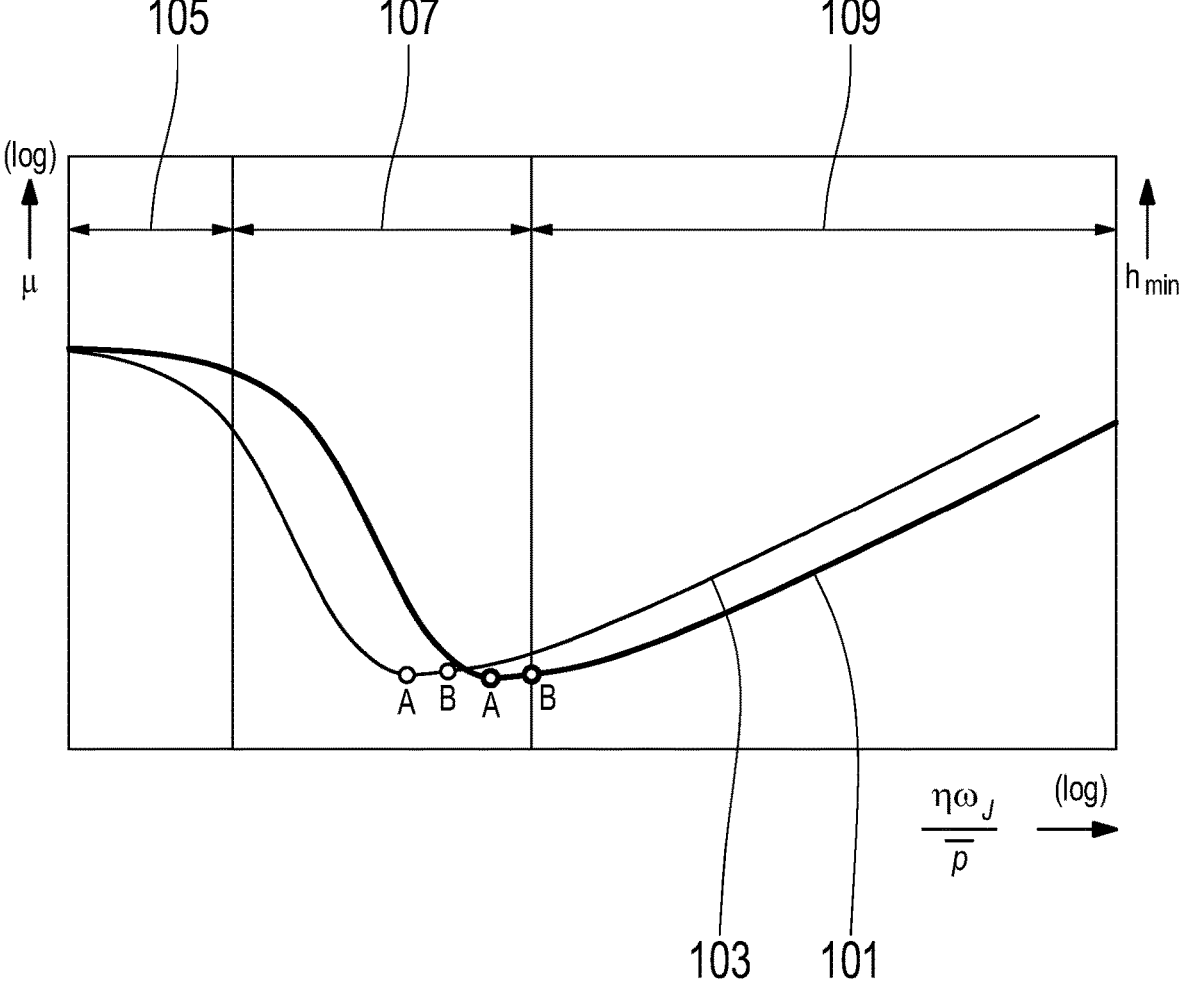

SELF-REPAIRING PLAIN BEARING

CROSS REFERENCE TO RELATED APPLICATIONS

This application is a U.S. National Phase application under 35 U.S.C. § 371 of International Application No. PCT/EP2020/079361, filed on Oct. 19, 2020, and claims benefit to German Patent Application No. DE 10 2019 218 117.1, filed on Nov. 25, 2019. The International Application was published in German on Jun. 3, 2021, as WO 2021/104748 A1 under PCT Article 21(2).

FIELD

The invention relates to a method for operating a plain bearing and a control device on which such a method can be implemented.

BACKGROUND

Hydrodynamic plain bearings can be operated in different lubrication states. Possible lubrication states are: boundary friction, mixed friction, or sliding friction. The transition between the friction states is continuous. In the ideal case, hydrodynamic plain bearings are exclusively operated using sliding friction. Here the sliding faces are completely separated by a stable lubricating film. No wear occurs in this operating state. Exclusive operation using sliding friction is, however, not possible in many applications, for example in wind power transmissions. If boundary friction or mixed friction arises, the bearing wears and finally fails in the advanced stage of wear.

The prior art reveals a so-called self-repairing wear effect. Self-repairing wear effects are described for example in "Schnell laufende Verbrennungsmaschinen" (H. Ricardo; Springer-Verlag, Berlin, 1926). The self-repairing wear effect makes it possible to smoothen the running surfaces of a damaged plain bearing. For this purpose, suitable operating points are specifically approached, where mixed friction exists. The effect of the mixed friction is that the rough spots that have been previously produced are smoothed again. Self-repairing wear effects can so far only be obtained under lab conditions.

The lubrication state of a plain bearing can be determined using structure-borne sound signals that are acquired using one or more acoustic emission sensors. Relevant methods are for example described in "Classification of Journal Bearing Friction States based on Acoustic Emission Signals" (N. Mokhtari, C. Guhmann; TM-Technisches Messen, volume 85, issue 6, 2018) and "Approach for the Migration of Hydrodynamic Journal Bearings based on Acoustic Emission Feature Change" (N. Mokhtari, C. Guhmann, S. Novolski; IEEE International Conference on Prognostics and Health Management (ICPHM), 2018). "Vibration Signal Analysis for the Life-time-Prediction and Failure Detection of Future Turbofan Components" (N. Mokhtari, M. Riskowski, C. Guhmann; Technische Mechanik 37, 2017) reveals a method for deriving a Stribeck curve from the signals of acoustic emission sensors.

SUMMARY

In an embodiment, the present disclosure provides a method for operating a plain bearing comprising: determining a first rotational speed at which a transition of a lubrication state takes place, or at which friction in the plain bearing is at a minimum; comparing the first rotational speed to a threshold value; and if the rotational speed has exceeded the threshold value, operating the bearing to produce a self-repairing effect.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 shows two Stribeck curves according to an embodiment of the present invention.

DETAILED DESCRIPTION

In an embodiment, the invention improves the operational safety of a plain bearing and prevents premature failures caused by damage.

The inventive method enables the specific use of self-repairing wear effects in an operational plain bearing.

The invention is based on the recognition that findings on the present condition of a plain bearing are requisite that are valid for the utilization of self-repairing wear effects in an operational transmission. A rotational speed that is present during a transition of the lubrication state of the plain bearing is used as an indicator of the condition. The inventive method correspondingly envisages determining a first rotational speed of the plain bearing as one of two alternatives, where a transition of the lubrication state takes place in the plain bearing or in a bearing gap of the plain bearing.

The rotational speed of the plain bearing refers to a relative rotational speed between two sliding surfaces of the plain bearing that can be rotated relative to each other. There is a bearing gap between the sliding surfaces where boundary friction, mixed friction, or liquid friction occurs as a function of the operating point. These three types of friction characterize the lubrication state of the plain bearing. A transition of the lubrication state is correspondingly equivalent to a transition between boundary friction and mixed friction, or between mixed friction and liquid friction. Therefore, a transition can take place from boundary friction to mixed friction, from mixed friction to boundary friction, from mixed friction to liquid friction, and/or from liquid friction to mixed friction.

The lubrication state or a transition of the lubrication state can be determined, as mentioned at the outset, by means of methods known from the prior art. In particular, acoustic emission sensors can be used for this purpose.

As an alternative, the first rotational speed characterizes an operating point at which the friction in the plain bearing, i.e. in its bearing gap, is at a minimum. This signifies that the friction in the plain bearing is larger at every other rotational speed than at the first rotational speed. Friction refers to a friction torque that the plain bearing counters a relative rotation of the sliding surfaces due to the friction developing in the bearing gap.

The operating point mentioned is preferably determined using a Stribeck curve. Methods for determining a Stribeck curve are known, as mentioned at the outset, from the prior art. A Stribeck curve assigns to each rotational speed of the plain bearing the corresponding friction arising in the bearing. The Stribeck curve therefore helps to determine a rotational speed, at which the friction is at a minimum.

The higher the first rotational speed, the worse the condition of the plain bearing. In particular roughened sliding surfaces lead to an increased first rotational speed. The first rotational speed is therefore an indicator of possible wear or damage of the plain bearing. According to an embodiment of the invention, the first rotational speed is therefore utilized as indicator of possible wear or damage of the plain bearing. A threshold value to which the first rotational speed is compared serves as a criterion for evaluating the condition of the plain bearing.

If the first rotational speed exceeds the threshold value, it has to be assumed that the plain bearing is worn or damaged. In an embodiment, the inventive method in this case provides for regenerating the plain bearing by means of self-repairing wear. The bearing is therefore operated in such a way that a self-repairing wear effect is produced, i.e. the bearing is exposed to operating states that give rise to a self-repairing wear effect. Other operating states are here avoided.

It is characteristic of such operating states for example that mixed friction occurs in the bearing gap.

In an embodiment of the method, a second rotational speed is determined. This happens preferably subsequent to the method steps described above. The second rotational speed, like the first rotational speed, is characterized in that a transition of the lubrication state of the plain bearing takes place or the friction in the plain bearing is at a minimum. The first rotational speed and the second rotational speed are therefore determined in the same manner. The statements above concerning determining the first rotational speed apply mutatis mutandis for the second rotational speed.

The second rotational speed serves to verify the effect of the self-repair. The smaller the second rotational speed, the more successful the self-repair was.

The second rotational speed is preferably compared to the first rotational speed. So, for example, the difference between the first rotational speed and the second rotational speed can be calculated. The bigger this difference is, the more successful the self-repair was.

As an alternative, it is possible to compare the second rotational speed to a predetermined reference rotational speed. The reference rotational speed can for example be a rotational speed, at which a transition of the lubrication state of an undamaged reference bearing takes place, or at which the friction in the reference bearing is at a minimum. A plain bearing in mint condition preferably serves as reference bearing. This can in particular be the above-mentioned plain bearing in mint condition. The reference rotational speed is then determined prior to the installation of the plain bearing.

Various measures can be taken depending on the result of the comparison. If the comparison leads to the result that the self-repair was successful, the plain bearing can continue to be operated without any change. If, however, the self-repair was not successful, a warning is emitted so that the plain bearing can be replaced in time. It is also possible to operate the plain bearing in a manner that avoids certain operating states which subject the plain bearing to an exceptional load.

An inventive control device implements the inventive method. A control device refers to a data processing apparatus.

An exemplary embodiment of the invention is illustrated in FIG. 1.

FIG. 1 illustrates a first Stribeck curve 101 and a second Stribeck curve 103. To the first Stribeck curve 101 are assigned the three operating states boundary friction 105, mixed friction 107, and liquid friction 109. A transition from the mixed friction 107 to the liquid friction 109 takes place at the so-called release point B. At point A, friction is at a minimum.

The self-repairing wear makes the first Stribeck curve 101 to merge into the second Stribeck curve. The second Stribeck curve 103 is shifted relative to the first Stribeck curve in the direction of low rotational speeds/to the left. The points A and B are likewise shifted. The further the shift, i.e. the larger the distance between the corresponding points A and B of the first Stribeck curve 101 and the second Stribeck curve 103, the more successful the self-repair was. The distance between the corresponding points A, B of both Stribeck curves 101, 103 can therefore serve as an indicator of the success of self-repair.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

101 first Stribeck curve
103 second Stribeck curve
105 boundary friction
107 mixed friction
109 liquid friction

The invention claimed is:

1. A method for operating a plain bearing comprising:
determining a first rotational speed corresponding to a speed at which a transition of a lubrication state of the plain bearing takes place, or at which friction in the plain bearing is at a minimum;
comparing the first rotational speed to a predetermined threshold value; and
if the first rotational speed has exceeded the predetermined threshold value, operating the bearing such that mixed friction occurs in a bearing gap of the plain bearing and avoiding boundary friction and liquid friction in the bearing gap of the plain bearing.

2. The method according to claim 1, further comprising:
determining, after operating the bearing such that mixed friction occurs in the bearing gap of the plain bearing and avoiding boundary friction and liquid friction in the bearing gap, a second rotational speed corresponding to a speed at which a transition of the lubrication state of the plain bearing takes place, or at which the friction in the plain bearing is at a minimum; and comparing the first rotational speed to the second rotational speed.

3. The control device on which the method according to claim 1 is implemented.

4. A method for operating a plain bearing comprising:

determining a first rotational speed corresponding to a speed at which, based on a present condition of the plain bearing, a transition of a lubrication state takes place, or at which friction in the plain bearing is at a minimum;

comparing the first rotational speed to a predetermined threshold value; and if the first rotational speed exceeds the predetermined threshold value, operating the plain bearing such that mixed friction occurs in a bearing gap of the plain bearing and avoiding boundary friction and liquid friction in the bearing gap of the plain bearing.

5. The method of claim 4, further comprising: determining a second rotational speed corresponding to a speed at which, based on a subsequent condition of the plain bearing after operating the plain bearing such that mixed friction occurs in the bearing gap and avoiding boundary friction and liquid friction in the bearing gap, a transition of the lubrication state of the plain bearing takes place, or at which the friction in the plain bearing is at a minimum; and comparing of the first rotational speed to the second rotational speed.

6. The method of claim 5, further comprising emitting a warning if, based on the comparison of the first rotational speed to the second rotational speed, operating the plain bearing such that mixed friction occurred in the bearing gap did not result in a decrease of the second rotational speed relative to the first rotational speed.

7. The method of claim 5, further comprising operating the plain bearing to avoid operating states that subject the plain bearing to excessive wear loads if operating the plain bearing such that mixed friction occurred in the bearing gap did not result in a decrease of the second rotational speed relative to the first rotational speed.

8. The method of claim 5, further comprising operating the plain bearing to avoid operating states associated with premature failure of the plain bearing if operating the plain bearing such that mixed friction occurred in the bearing gap did not result in a decrease of the second rotational speed relative to the first rotational speed.

* * * * *